United States Patent [19]
Federspiel et al.

[11] 3,869,014
[45] Mar. 4, 1975

[54] STARTING INTERLOCK SYSTEM

[75] Inventors: Joseph A. Federspiel, Port Washington; Edward W. Pawlowski, Belgium, both of Wis.

[73] Assignee: FMC Corporation, San Jose, Calif.

[22] Filed: Feb. 19, 1974

[21] Appl. No.: 443,662

[52] U.S. Cl. ............................ 180/53 R, 180/103
[51] Int. Cl. ..................... B60r 18/00, A01d 75/18
[58] Field of Search ...... 180/53 R, 77 R, 82 R, 103; 307/9, 10 R; 56/10.2; 200/61.58 R

[56] References Cited
UNITED STATES PATENTS
| | | | |
|---|---|---|---|
| 3,229,792 | 1/1966 | Hock | 180/77 R X |
| 3,608,285 | 9/1971 | Berk | 180/53 R X |
| 3,731,471 | 5/1973 | Bening | 180/53 R X |

*Primary Examiner*—David Schonberg
*Assistant Examiner*—T. L. Siemens
*Attorney, Agent, or Firm*—A. J. Moore; C. E. Tripp

[57] ABSTRACT

A single snap-action, straight arm, interlock switch is pivoted to a vehicle chassis and has its body pivoted between an active position in response to locking the vehicles brakes and an inactive position when the brakes are released. When the switch body is in its active position the switch element is contacted to activate or close the switch only after a power take-off mechanism has been moved to a position which disengages the power take-off at which time the interlock switch is closed thereby partially preparing the engine starting circuit allowing the engine to be started upon closing of a start switch. If either the power take-off lever is in its engaged position or the brakes are released, the single interlock switch will not be closed but will remain in its normal open position thereby preventing starting of the engine by closing the start switch.

14 Claims, 10 Drawing Figures

PATENTED MAR 4 1975

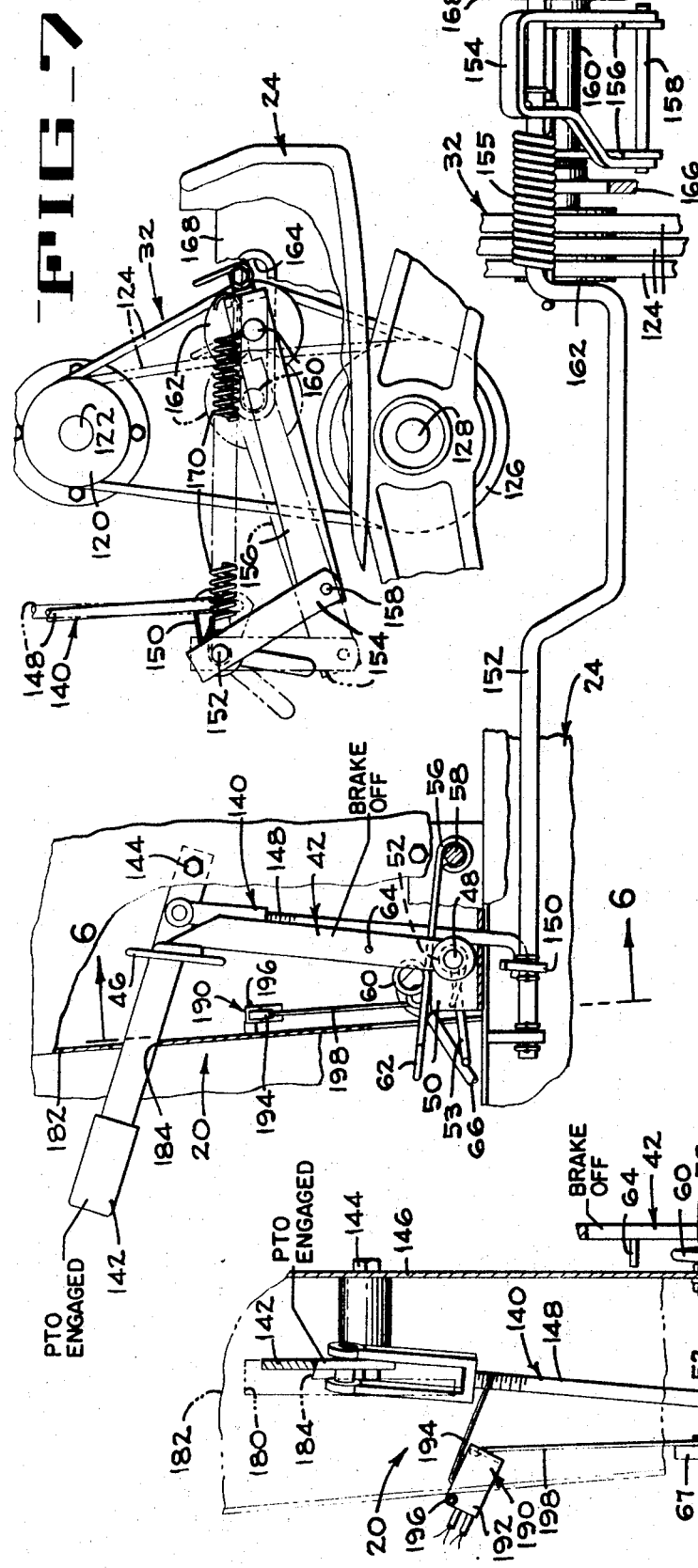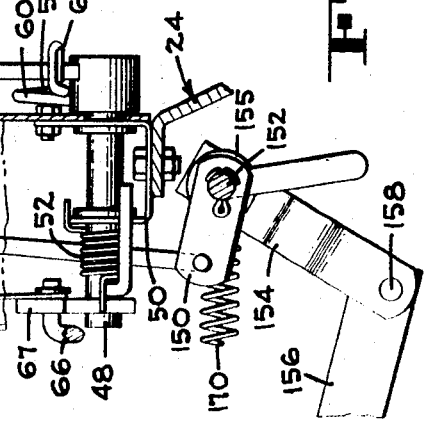

PATENTED MAR 4 1975
3,869,014
SHEET 5 OF 5
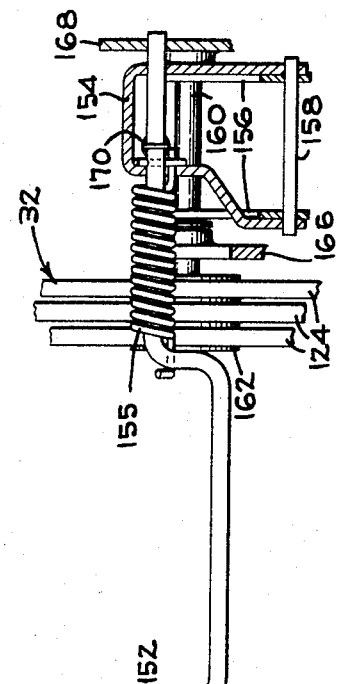
FIG_8
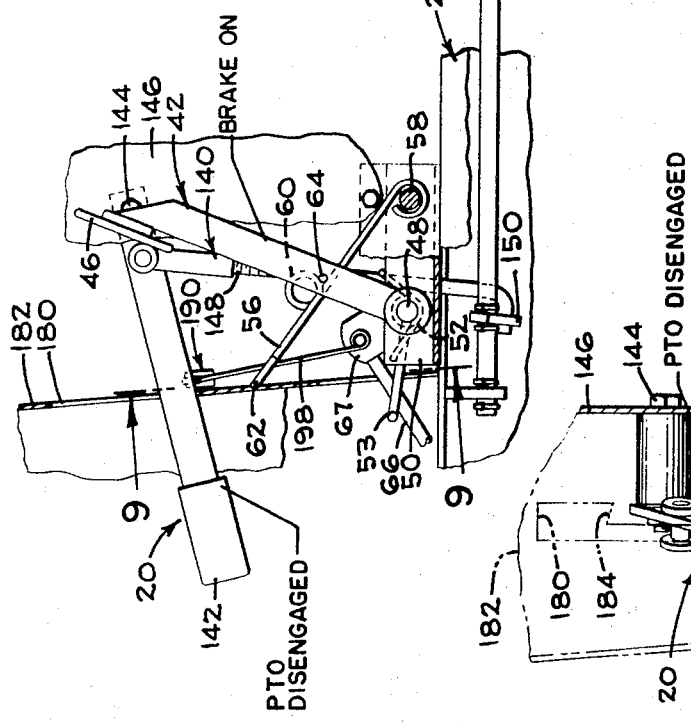
FIG_9
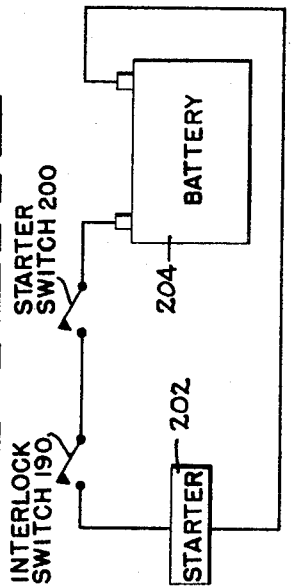
FIG_10
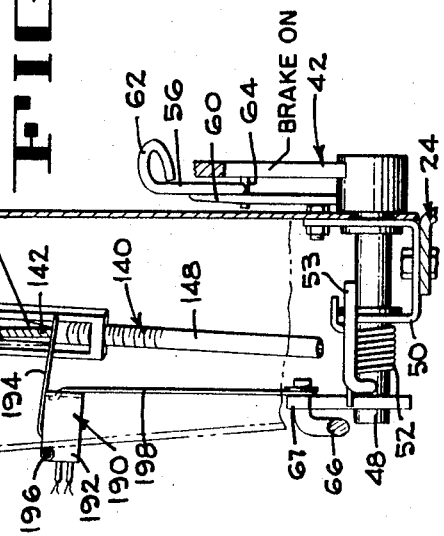

STARTING INTERLOCK SYSTEM

BACKGROUND OF THE INVENTION

1. Field of the Invention

This invention pertains to garden or lawn type vehicles and more particularly relates to a starting system interlock for such vehicles.

2. Description of the Prior Art

Starting interlock systems for engine driven vehicles have been used for many years to protect the operator from injury. Many of these prior art systems require two or more switches and are not only expensive but require precise adjustments from time to time when linkages begin to wear in order to keep the interlock system operational. The use of several interlock switches also increases the amount of wiring and frequency of electro-mechanical failures in proportion to the number of switches used.

As an example of the most pertinent prior art devices, the patent to Smith U.S. Pat. No. 3,689,775 discloses a safety control circuit associated with a magneto controlled engine which closes a switch to short circuit the ignition circuit if a garden tractor is in gear. The switch is closed by moving a single transmission level to its neutral position and is not in any way influenced by the position of the brakes of the tractor.

Miley et al. U.S. Pat. No. 3,626,676 discloses a riding mower which includes a drive clutch and a mower clutch. If either or both, the drive transmission or the mower is engaged one or two interlock switches will be closed thereby short circuiting the ignition system so that the mower cannot be started.

Berk U.S. Pat. No. 3,608,285 discloses an interlock system for a riding mower which prevents starting of the engine when either the vehicle clutch or the mower clutch is engaged.

The patent to Phillips U.S. Pat. No. 3,505,896 is assigned to the assignee of the present invention and discloses a tractor with a hydrostatic transmission somewhat similar to that used in the present invention. Accordingly, the disclosure of this patent is incorporated by reference herein.

SUMMARY OF THE INVENTION

The starting interlock system of the present invention provides for a simple, inexpensive and reliable interlock system which uses only one interlock switch which is closed and will permit starting of the engine only after the brakes have been locked and the power take-off mechanism has been placed in neutral. Locking of the brakes also indirectly locks the drive transmission in neutral, and prevents the vehicle from unexpectedly rolling down a slope or the like.

It is, therefore, an object of the present invention to provide an interlock system for a vehicle, which system requires only one interlock switch for preventing the starting of the vehicle engine unless the vehicles brakes are locked and the power take-off mechanism is disengaged.

Another object is to provide a single switch, interlock system wherein the drive transmission and the power take-off mechanism must both be in neutral, and the brakes must be locked before the engine can be started.

BRIEF DESCRIPTION OF THE DRAWINGS

FIG. 3 is a diagrammatic vertical central section of the linkages of FIG. 2 along with the single interlock switch and its linkage illustrated in the raised active position, the brake linkage being in its locked position with the transmission being locked in neutral, certain parts of the tractor being shown in phantom and other parts being removed.

FIG. 4 is a diagrammatic vertical central section similar to FIG. 3 but showing the brake and transmission linkages in their released positions, and illustrating the interlock switch in its inactive position.

FIG. 5 is an enlarged side elevation of the interlock switch linkage and the power take-off linkage with the parts being shown in position to engage the power take-off, and with the interlock switch being in its lower inactive position.

FIG. 6 is a section taken along lines 6—6 of FIG. 5.

FIG. 7 is a front view of a power take-off mechanism taken looking in the direction of arrows 7—7 of FIG. 1 showing the power take-off mechanism in its engaged position.

FIG. 8 is a side elevation similar to FIG. 5 but illustrating the power take-off linkage in a disengaged position and the interlock switch in its raised active position.

FIG. 9 is a section taken along lines 9—9 of FIG. 8.

FIG. 10 is a simplified diagrammatic wiring diagram of the starting interlock system.

DESCRIPTION OF THE PREFERRED EMBODIMENT

Figure 1:
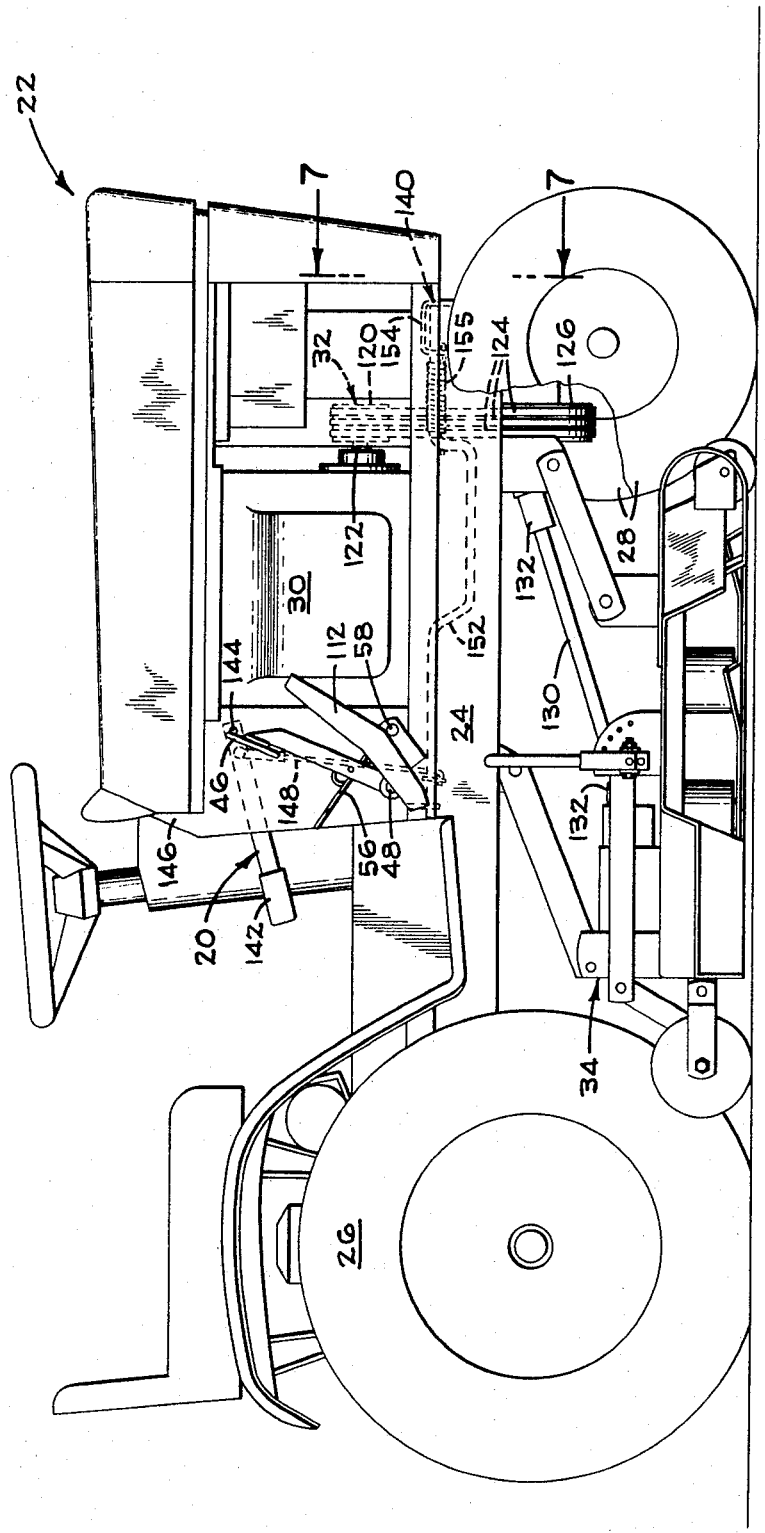
FIG. 1 is a side elevation of a garden type tractor having a mower attached thereto and driven by a manually operated power take-off drive.

The starting interlock system 20 (FIG. 1) is incorporated in a garden tractor 22 having its chassis 24 mounted on two rear drive wheels 26 and two steerable front wheels 28. The tractor includes an engine 30 which drives a power take-off mechanism 32 connected to an implement 34 such as the illustrated lawn mower. The engine 30 is coupled to a hydrostatic transmission 36 (FIGS. 2 and 3) which is connected to the rear tractor drive wheels 26 in a manner well known in the art.

Figure 2:
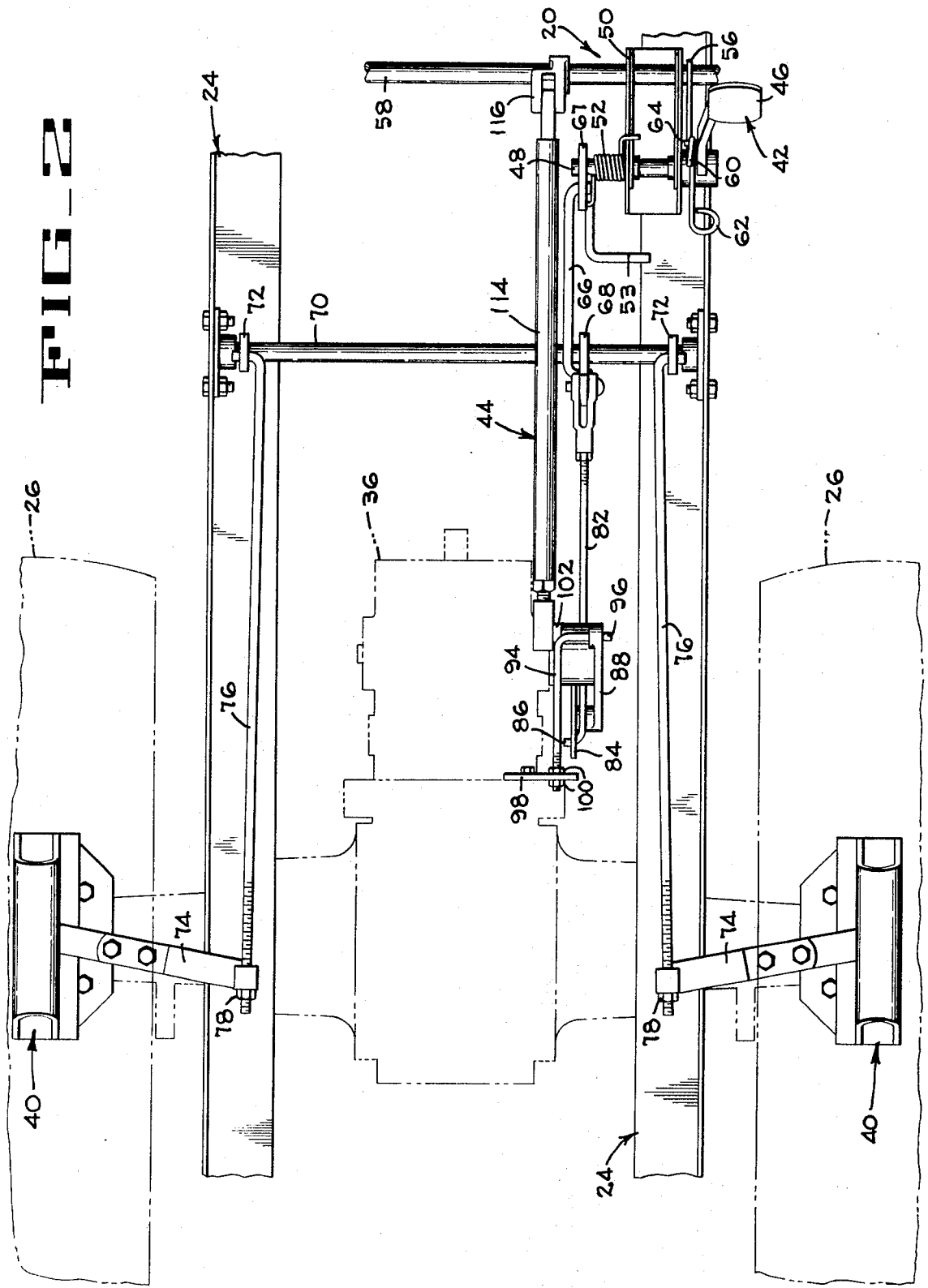
FIG. 2 is a diagrammatic plan of the brake and hydrostatic transmission linkages of the tractor with certain parts being removed and other parts being shown in phantom.
Figures 3, 4:
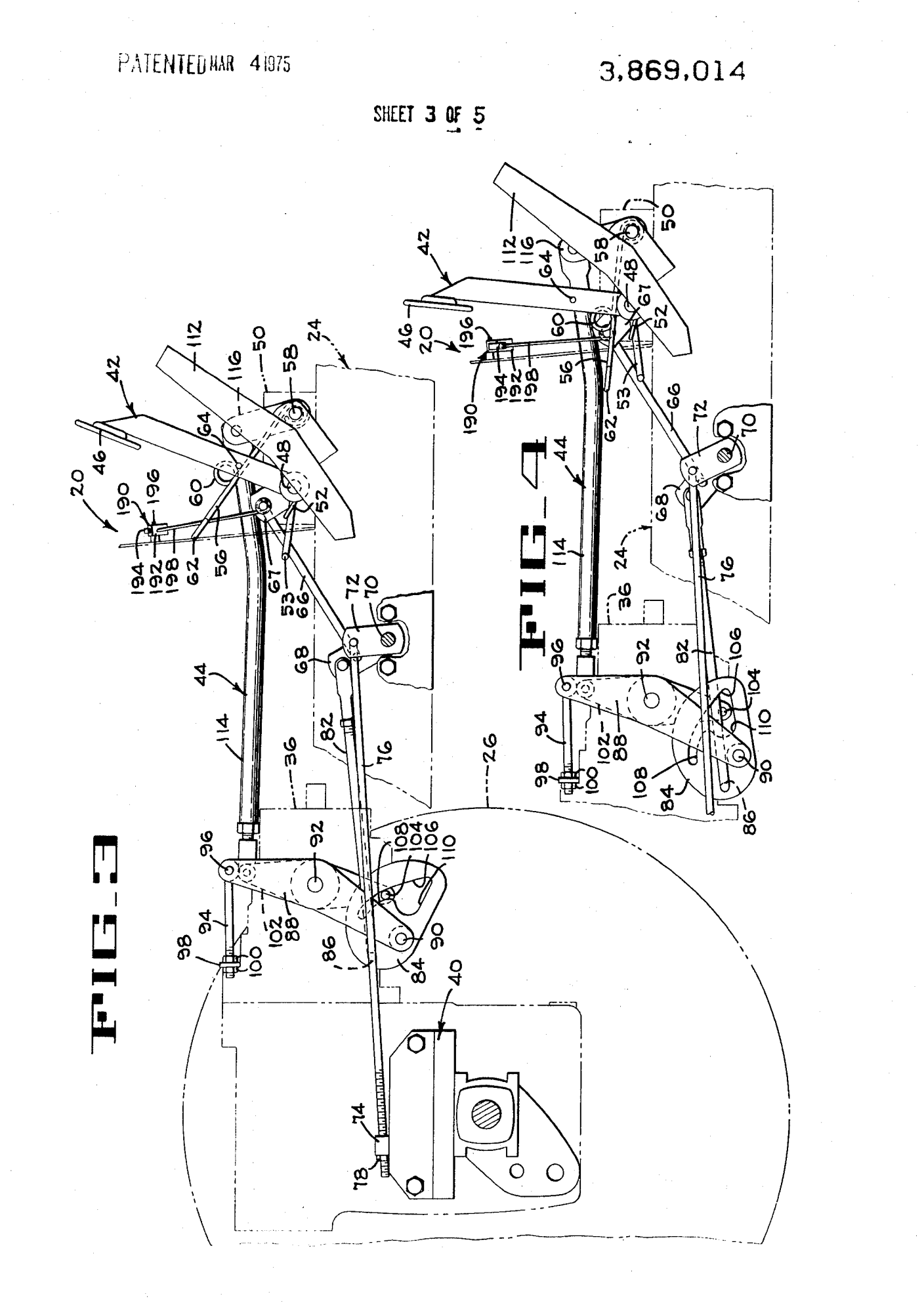

As shown in FIGS. 2 and 3, the rear wheels 26 are provided with brakes 40 controlled by a brake linkage system 42, and the hydrostatic transmission 36 is controlled by a transmission linkage system 44.

The brake linkage system 42 (FIGS. 2-4 includes a brake pedal 46 secured to a stub shaft 48 pivoted on a bracket 50 secured to the chassis 24. A torsion spring 52 (FIGS. 2 and 6) is wound around the stub shaft 48 and is connected between the bracket 50 and an L-shaped stop arm 53 secured to the shaft 48. The stop arm is positioned to contact the chassis 24 to limit the amount of counterclockwise movement of the brake pedal 46, and the spring 52 is arranged to urge the brake pedal 46 toward its "off" or brake releasing position. A wire latch 56 has its forward end bent around a shaft 58 and is provided with a brake locking loop 60 and a handle 62. When an operator wants to lock the brakes in the park position, he merely pushes the brake pedal 46 full forward and then grips the handle 62 lifting the latch 56 upwardly to the FIG. 3 position until the loop 60 is disposed behind a pin 64 secured to the pedal, which engagement between the pin and the loop holds the brake in its locked or park position as indicated in FIGS. 2, 3, 8 and 9. The brake may be released by hard foot pressure against the pedal at which time the latch 56 gravitates to the position illustrated in FIGS. 4–6.

A link 66 pivotally connects a lever 67 secured to the shaft 48 to a lever 68 (FIGS. 2, 3 and 4) secured to a cross shaft 70 journaled on the chassis 24. The cross shaft 70 has two spaced levers 72 secured thereto, which levers 72 are secured to associated brake levers 74 by connecting links 76 having brake adjusting nuts 78 threaded thereon. The brakes 40 are preferably disc brakes of the type manufactured by Auto Specialties Mfg. Co., of St. Joseph, Mich., 49085 and identified by Part No. 26616 or 26617.

The lever 68 on the cross shaft 70 is connected by a link 82 to a transmission locking cam 84 by a curved end portion 86. The locking cam 84 is pivoted to the lower end of a transmission actuating lever 88 by a pivot pin 90. The lever 88 is pivoted about the control shaft 92 of the hydrostatic transmission 36 and is locked in desired position by an adjustable link 94 connected to the lever 88 at 96 and to a tab 98 on the transmission by lock nuts 100. A transmission actuating lever 102 (FIGS. 3 and 4) is rigidly secured to the control shaft 92 of the transmission and includes a pin 104 at its lower end which projects into a slot 106 formed in the locking cam 84. The slot 106 includes a narrow locking portion 108 which locks the transmission 36 in neutral when the brakes 40 are locked as indicated in FIG. 3. When the brakes 40 are released, the pin 104 is disposed in a wide portion 110 of the slot 106 thus permitting the transmission actuating lever 102 and control shaft 92 to be pivoted in either direction from neutral position illustrated in FIG. 4 thereby driving the tractor in either a forward or reverse direction.

The transmission actuating lever 102 is operated through a drive pedal 112 which is secured to the pivot shaft 58. A lever 116 secured to the shaft 58 is connected to the transmission actuating lever 102 by an adjustable link 114. When the parts are positioned as indicated in FIG. 4, pressure by the toe of the operator on the upper end of the drive pedal 112 causes the tractor to move forward, while pressure from the operator's heel will cause the tractor to move in a reverse direction. When the parts are positioned as indicated in FIG. 3, the drive pedal 112 will be held from movement by the pin 104 which is engaged in the narrow locking portion 108 of the slot 106 in the cam 84.

As best illustrated in FIGS. 5–8, the power take-off mechanism 32 receives its power from a multiple sprocket pulley 120 (FIG. 1) keyed to a front output shaft 122 of the engine 30. A plurality of V-belts 124 are trained around a driven pulley 126 secured to a power take-off shaft 128 journaled on the chassis and connected in driving engagement to the implement 34 by a telescopic shaft 130 (FIG. 1) and universal joints 132.

The linkage system 140 for engaging and disengaging the power take-off mechanism 32 is best illustrated in FIGS. 1, 5, 7 and 8. The linkage system 140 is actuated by a power take-off lever 142 pivoted at 144 to an upright portion of the engine housing 146. A link 148 is pivoted between the lever 142 and a lever 150 secured to an actuating rod 152 journaled on the chassis 24. A generally U-shaped lever 154 is pivotally secured to the rod 152 and is urged in a counterclockwise direction by a torsion spring 155 connected between the lever 154 and an offset portion of the rod 152. The U-shaped lever 154 is pivotally connected to one end of an idler shaft bail 156 by a pivot pin 158. The idler shaft bail 156 carries a shaft 160 upon which an idler pulley 162 is journaled.

The shaft 160 projects through two slots 164 (only one being shown in FIG. 7) in transverse members 166 and 168 of the chassis 24. A relatively weak tension spring 170 is connected between the rod 152 and the free end of the idler support 156 for urging the idler support and pulley 162 toward its disengaged position.

As illustrated in FIG. 7, counterclockwise movement of the rod 152 tightens the belts 124 thus engaging the power take-off mechanism 32, while clockwise movement disengages the mechanism by loosening the belts. It will be apparent that downward movement of the power take-off lever 142 and link 148 to the positions illustrated in FIGS. 8 and 9 disengages the power take-off mechanism, while upward movement of the lever to the position illustrated in FIGS. 5 and 6 engages the power take-off mechanism. As best shown in FIGS. 6, 8 and 9, the power take-off lever 142 is slidably received in a vertical slot 180 in the dashboard 182 of the tractor and is locked in the upper engaged position by transversely moving the lever 142 to a position above a shoulder or detent 184 projecting into the slot 180.

Although the above described mechanical components of the tractor 22 are old in the art, the brake, transmission, and power take-off linkage systems are necessarily incorporated in the starting interlock system 20 of the present invention.

In addition to the above mentioned linkages, the starting interlock system 20 (FIGS. 5, 6, 8 and 9) includes a single snap action, interlock switch 190 which includes a body 192 and a switch actuating element 194 pivoted to the dashboard 182 by a pivot pin or bolt 196. A linkage 198 is pivotally connected between the switch body 192 and the link 66 of a brake linkage system 42. Accordingly, when the brake linkage system 42 is in the "on" or locked position, the switch body 192 and its actuating element 194 are bodily pivoted to their upper active position as illustrated in FIGS. 8 and 9. It is to be recognized that when the brakes are locked, that the hydrostatic transmission 36 (FIG. 3) is locked in the neutral position by virtue of a pin 104 being in the narrow cam slot 108. When the brake is in its "off" position, the interlock switch 190 and its actuating element are bodily pivoted to their lower inactive position illustrated in FIGS. 5 and 6.

When the power take-off lever 142 is in its lower disengaged position of FIGS. 8 and 9, it contacts the switch element 194 thereby closing the switch 190. When the power take-off lever 142 is in its upper engaged position illustrated in FIGS. 5 and 6, the switch element 194 is not contacted by the lever and accordingly remains open.

As diagrammatically illustrated in FIG. 10, the single interlock switch 190 and an ignition-starter switch 200 are connected in series with the engine's starter motor 202 and a battery 204. Thus, in order to start the engine 30, the start switch 200 and interlock switch 190 must both be closed. In order to close the interlock switch 190, the brake linkage 42 must be in position to lock the rear wheels of the tractor from rotation, and also the power take-off linkage system 140 must be in its disengaged position with the power take-off lever 142 in its lower position as illustrated in FIGS. 8 and 9. When the parts are positioned as in FIGS. 8 and 9, the operator merely closes the starter switch 200 thereby engaging the starter motor 202 thus starting the engine 30. If either the brakes are "off," or the power take-off mechanism 32 is engaged, the circuit to the starter motor 202 will remain open even if the starter switch 200 is closed since interlock switch 190 remains open.

From the foregoing description it is apparent that the starting interlock system of the present invention includes a single normally open interlock switch which will remain open and prevent starting of the tractor's engine unless the power take-off mechanism is disengaged and the brakes are on. Also, the linkage systems are arranged so that the hydrostatic transmission is locked in neutral when the brakes are on.

Although the best mode contemplated for carrying out the present invention has been herein shown and described, it will be apparent that modification and variation may be made without departing from what is regarded to be the subject matter of the invention.

What we claim is:

1. A starting interlock system for a vehicle powered by an engine which is started by a starter motor in a starting circuit receiving its power from a battery in response to closing a starter switch, the vehicle including wheels driven from the engine through a transmission and brakes for arresting movement of the wheels, the vehicle also including a power take-off mechanism for driving an implement; the improvement which comprises a single interlock switch in said starting circuit having a body and a switching element, and means responsive to movement of the brakes to their locking position and disengagement of said power take-off mechanism for partially completing said starting circuit for permitting starting of the engine upon closing of the starter switch.

2. A starting interlock system according to claim 1 wherein said interlock switch includes a body and a switch element mounted on the vehicle and movable in response to locking the brakes from an inactive to an active position, and means responsive to disengagement of said power take-off mechanism for contacting said switch element and closing said interlock switch only when said switch body is in its active position.

3. A starting interlock system according to claim 2 wherein said switch body is pivoted to said vehicle and is pivoted between its active and inactive position.

4. A starting interlock system according to claim 1 wherein said interlock switch is a normally open switch.

5. A starting interlock system for a vehicle powered by an engine which is started by a starter motor in a starting circuit receiving its power from a battery in response to closing a starter switch, the vehicle including wheels driven from the engine through a transmission and having brakes for arresting movement of the vehicle with brake and transmission linkage systems for controlling the brake and transmission, the vehicle also including a power take-off mechanism for driving an implement and a power take-off linkage system for selectively engaging or disengaging the power take-off mechanism; the improvement which comprises a single normally open interlock switch in said starting circuit having a body and a switching element, means for movably mounting the body of the interlock switch to the vehicle, means interconnecting the body of the interlock switch to one of said linkage systems for moving the switch body between an active and an inactive position, and means included in one of the other linkage systems for contacting said switch element and closing said interlock switch only when said switch body is in its active position for allowing starting of the engine upon closing of the starter switch.

6. A starting interlock system according to claim 5 wherein said one linkage system is the brake linkage system.

7. A starting interlock system according to claim 5 wherein said other linkage system is the power take-off linkage system.

8. A starting interlock system according to claim 5 wherein said interconnecting means pivotally connects the switch body to the vehicle.

9. A starting interlock system according to claim 5 wherein said brake linkage system is effective when moved to its brake locking position to lock said transmission in neutral.

10. A starting interlock system according to claim 5 wherein said interconnecting means includes a link pivotally connected between the brake linkage system and said interlock switch body.

11. A starting interlock system according to claim 6 wherein said other linkage system is the power take-off linkage system.

12. A starting interlock system according to claim 10 wherein said one linkage system is the brake linkage system.

13. A starting interlock system according to claim 10 wherein said other linkage system is the power take-off linkage system.

14. A starting interlock system according to claim 10 wherein said interlock switch body is pivotally connected to the vehicle.

* * * * *